United States Patent [19]

Fuji et al.

[11] Patent Number: 4,939,710
[45] Date of Patent: Jul. 3, 1990

[54] OPTICAL MAGNETIC MEMORY DEVICE UTILIZING NON-RECORDED PORTIONS OF RECORDING MEDIUM TO REPRESENT DATA

[75] Inventors: Hiroshi Fuji, Tenri; Shigemi Maeda, Yamatokoriyama; Takeshi Yamaguchi, Tenri; Toshihisa Deguchi; Shozou Kobayashi, both of Nara, all of Japan

[73] Assignee: Sharp Kabushiki Kaisha, Osaka, Japan

[21] Appl. No.: 214,930

[22] Filed: Jul. 1, 1988

Related U.S. Application Data

[63] Continuation of Ser. No. 916,648, Oct. 8, 1986, abandoned.

[30] Foreign Application Priority Data

Oct. 8, 1985 [JP] Japan .................. 60-224601
Nov. 25, 1985 [JP] Japan .................. 60-266752

[51] Int. Cl.$^5$ .................. G11B 13/04; G11B 11/12
[52] U.S. Cl. .................. 369/13; 360/114; 369/124
[58] Field of Search .................. 369/13, 47, 48, 54, 369/58, 59, 124; 360/114, 59, 40; 365/122

[56] References Cited

U.S. PATENT DOCUMENTS

| | | | |
|---|---|---|---|
| 3,513,457 | 5/1970 | Nelson | 369/13 |
| 3,696,346 | 10/1972 | Zook | 365/122 |
| 4,472,748 | 9/1984 | Kato et al. | 360/114 |
| 4,475,183 | 10/1984 | Marchant et al. | 369/59 |
| 4,586,161 | 4/1986 | Skoda | 369/13 |
| 4,663,676 | 5/1987 | Voegeli | 360/40 |
| 4,688,203 | 8/1987 | Koishi et al. | 369/48 |
| 4,737,947 | 4/1988 | Osato et al. | 369/13 |

FOREIGN PATENT DOCUMENTS

| | | |
|---|---|---|
| 0089045 | 3/1983 | European Pat. Off. . |
| 0097092 | 6/1983 | European Pat. Off. . |
| 0144436 | 4/1984 | European Pat. Off. . |
| 0156916 | 9/1984 | European Pat. Off. . |
| 5216208 | 7/1975 | Japan . |
| 0167257 | 6/1981 | Japan .................. 360/40 |
| 57-24046 | 2/1982 | Japan .................. 360/114 |
| 59-152551 | 2/1983 | Japan . |
| 59-65935 | 4/1984 | Japan .................. 369/58 |
| 60-05404 | 1/1985 | Japan .................. 360/114 |
| 61-187139 | 8/1986 | Japan .................. 369/13 |
| 2083677 | 3/1982 | United Kingdom .................. 369/13 |
| 8404417 | 11/1984 | World Int. Prop. O. .................. 369/59 |

Primary Examiner—Steven L. Stephan
Assistant Examiner—Hoa Nguyen

[57] ABSTRACT

An optical magnetic memory device includes an optical magnetic recording medium such as a disc having recording magnetic film at least on one side thereof and initialized in a certain direction in advance, a recording section for recording data in such a manner that data-recorded portions and non-recorded portions are alternately formed, and a reproducing section for reproducing data from the recording medium by detecting the interval between the recorded or non-recorded portions. The reproducing section comprises a detector for detecting positive and negative peaks of signals reproduced from the recorded or non-recorded portion and a selector for selecting either of the detection outputs from the detector according to a control signal.

5 Claims, 6 Drawing Sheets

OPTICAL MAGNETIC MEMORY DEVICE UTILIZING NON-RECORDED PORTIONS OF RECORDING MEDIUM TO REPRESENT DATA

This application is a continuation of application Ser. No. 916,648 filed on Oct. 8, 1986, now abandoned.

BACKGROUND OF THE INVENTION

The present invention relates to an optical magnetic memory device having magnetic film as a recording medium and which records, reproduces and/or erases data by irradiating the recording medium with an optical beam such as a laser beam.

Conventionally, two types of optical magnetic disc are known as typical optical memory devices; one having magnetic film only on one side thereof and the other having magnetic film on both sides as a recording medium. When data in a disc with magnetic film on both sides is to be reproduced by the conventional optical magnetic memory device capable of reproducing data from the disc with magnetic film only on one side, data in one of the magnetic films may be reproduced but it is unlikely that data in the other magnetic film will be reproduced satisfactorily.

Generally, in recording data with an optical magnetic memory device, recorded bits and non-recorded bits are formed in the recording medium (disc) with magnetic film thereon. The memory device reproduces the data by detecting the interval between the recorded bits (non-recorded portions) as reference marks. However, a data signal obtained by this reproduction process may not be reliable.

SUMMARY OF THE INVENTION

Accordingly, an object of the present invention is to provide an optical magnetic memory device capable of reproducing satisfactorily the data recorded in the recording medium having magnetic film at least on one side of the disc.

Another object of the present invention is to provide an optical magnetic memory device capable of reproducing data satisfactorily regardless of whether the recording medium has magnetic film on one side or on both sides thereof.

Another object of the present invention is to provide a data bit recording and reproducing system which increases recording density and enhances the reliability of reproduced data signals.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, according to an embodiment of the present invention, an optical magnetic memory device comprises an optical magnetic recording medium (disc) with magnetic film at least on one side and initialized in a certain direction in advance, data recording means which forms data recorded portions with non-recorded portions occurring alternately therebetween in the magnetic film of the optical magnetic recording medium, and means for reproducing the data from the recording medium by detecting the interval between the recorded or non-recorded portions, the reproducing means containing means for detecting the positive and negative peak positions of the signal reproduced from the recorded or non-recorded portion and means for selecting either of the outputs from the detecting means according to a control signal.

To achieve the above objects, according to another embodiment of the present invention, an optical magnetic memory device, which contains an optical recording medium with magnetic film on both sides thereof and initialized in one direction in advance and which records data so as to allow detection of the interval between recorded marks, comprises means for detecting the positive and negative peaks of a reproduced signal and means for reproducing data by selecting either of the outputs from the detecting means according to a control signal such as a recorded side identification signal.

To achieve the above objects, according to a further embodiment of the present invention, an optical memory device, capable of recording, reproducing or erasing data by irradiate the optical data recording medium with a laser beam spot, records data in such a manner as to allow detection of the interval between non-recorded portions to be used as reference marks for reproduction of the data.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 4 (b) shows a reproduced signal of the memory device of FIG. 4 (a);

FIG. 5 is a circuit diagram showing the construction of the data reproducer of the optical magnetic memory device on which the present invention is based;

FIG. 6 is a signal waveform chart showing the signal waveforms generated in the reproducer of FIG. 5;

FIGS. 7 (b) and 8 (b) show the waveforms of signals reproduced by the optical magnetic memory devices of FIGS. 7 (a) and 8 (a), respectively;

DETAILED DESCRIPTION OF THE INVENTION

An optical magnetic memory device of the present invention is described using an optical magnetic disc memory device as an example.

Figure 4:
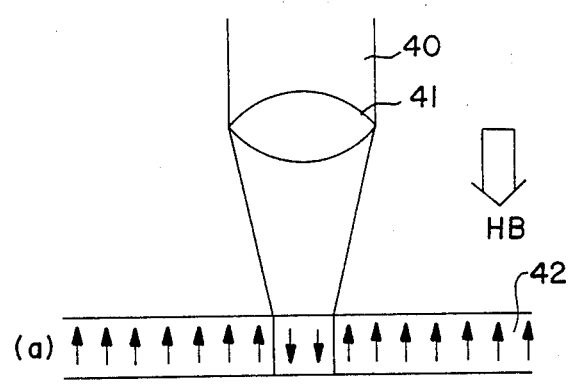
FIG. 4 (a) is a chart for explaining an optical magnetic memory device on which the present invention is based.

As shown in FIG. 4, the optical magnetic disc memory device records, reproduces and/or erases information by radiating a laser beam 40 condensed by an objective lens 41 onto a recording medium with magnetic film 42 whose easy magnetization axis is perpendicular to the film surface formed on a substrate.

Recording and reproducing operation of the optical magnetic disc memory device are described in detail with reference to FIG. 4.

To record information, the laser beam 40, condensed to about 1μm diameter by the objective lens 41 and modulated in intensity according to the recording signal, is radiated onto the magnetic film 42. Then, the irradiated part of the magnetic film 42 rises in temperature and decreases in coercive force. With simultaneous application of an external bias magnetic field $H_B$, the magnetization direction is reversed to be oriented in the same direction as the bias magnetic field $H_B$ so that information is recorded.

To reproduce the information, a linear polarized laser beam of lower intensity than the beam for recording is radiated onto the magnetic film 42. Then, the magneto-optic effect (Kerr effect) causes the plane of polarization of the reflected light to be inclined. This inclination is detected by an analyzer and converted into luminous intensity which is detected by an optical detector. A reproduced signal 46 with positive peaks corresponding to the recorded marks is thus obtained as shown in FIG. 4 (b). Information can be reproduced by detecting the peak positions of the reproduced signals 46.

The procedure for reproducing information data from the reproduced signal is described with reference to FIG. 5.

The signal reproduced by a reproducing head 1 is amplified by the amplifier 2 before being input to a differential circuit 4 and to an amplitude detector circuit 11 in a peak detector circuit 3 (enclosed by broken line). Signal output 13 from the differential circuit 4 is converted to a digital signal by a zero-cross detector circuit 5. The peak position is then detected in the following manner. The circuitry comprising an inverter 6, a resistance 7, a capacitor 8 and a NOR gate 9 detects positive peaks of the reproduced signal 12 or the falling edge of the signal output from the zero-cross detector circuit 5 and outputs a peak position identifying signal 14. An AND gate 10 takes the logical product between the signal 14 and a signal output 15 from the amplitude detector signal 11, and outputs a peak detection signal 16 which corresponds to positive peaks alone. The peak detection signal 16 is transmitted to a data demodulator circuit where it is converted to information data.

The above procedure is now described referring to FIG. 6 which shows the signal waveforms. The same signals are described by the same numbers in FIGS. 5 and 6. The reproduced signal 12 has positive peaks at positions corresponding to information data. The reproduced signal 12 is converted to a differential signal 13 in the differential circuit 4. The differential signal 13 crosses the zero level from the positive to the negative side at the positive peak position of the reproduced signal 12. Accordingly, the signal output from the zero-cross detector circuit 5 starts falling at the positive peak position. Therefore, the signal 14 has detected the positive peak position of the reproduced signal 12 by detecting the falling edge of the signal 13. The signal 14 and the amplitude detection signal 15 are input to the AND gate 10 which takes their logical product and outputs the peak detection signal 16 which corresponds to the positive peak alone.

As mentioned above, the optical magnetic disc, whose recorded information is erasable, has magnetic film on one or both sides. For the optical magnetic disc with magnetic film 42 on both sides as shown in FIG. 7 and 8, it is natural that the optical memory device is so constructed as to record, reproduce and/or erase information on each side of the disc independently.

Such construction is described below. The two magnetic films (which are separated by a separation layer 43) are referred to as the side A and the side B, respectively. It is assumed that both magnetic films have been initialized or magnetized in the same direction.

Figure 7:
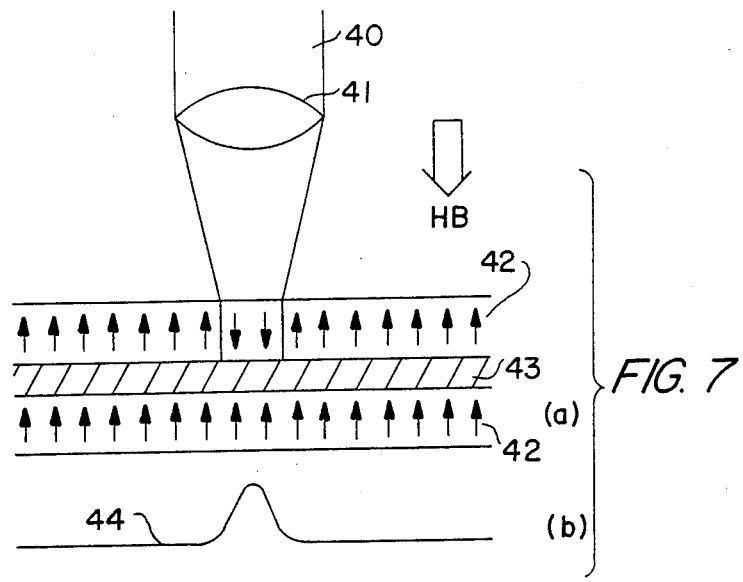
FIGS. 7 (a) and 8 (a) are charts for explaining an optical magnetic memory device having magnetic film on both sides.

First, the mechanism of recording and reproduction on the side A is described referring to FIG. 7 (a). For recording, laser beam 40 condensed by the objective lens 41 is radiated on the side A of the magnetic film 42. Then, the magnetization orientation is reversed to coincide with the direction of the bias magnetic field $H_B$ whereby recording is conducted. When reproduced, the reproduced signal 44 contains positive peaks at positions corresponding to the recorded marks as shown in FIG. 7 (b).

Figure 8:
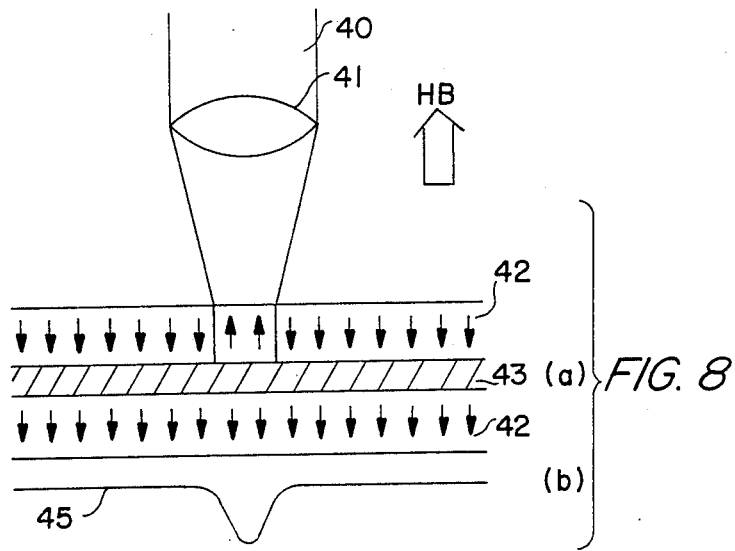

For recording on the side B, the direction of the bias magnetic field $H_B$ needs to be reversed as the side B has been initialized in the same direction as the side A as shown in FIG. 8 (a). In other words, recording is conducted from the opposite side for the side B, compared with that for the side A. As a result, the magnetization orientation of the recorded mark on the side B is reversed from that on the side A. Accordingly, the reproduced signal 45 of the side B has opposite polarity from that of the reproduced signal 44 of the side A. Namely, the signal 45 has negative peaks at positions corresponding to the recorded marks, as shown in FIG. 8 (b). Therefore, it is necessary to detect negative peak positions for reproduction from the side B.

As understood from the above, when the recording medium has magnetic films on both sides, namely the side A and the side B, and when the films have been initialized in the same direction, reproduced signals from the side A and the side B have opposite polarities from each other. Supposing reproduction is based on detection of the intervals between recorded marks, if information is to be reproduced by a data reproducer capable of detecting positive peaks alone as shown in FIG. 5, information data may not be reproduced for side B due to the incapability of detecting negative peaks of the side B.

An optical magnetic memory device is now described having magnetic films on the side A and the side B which have been initialized in the same direction as mentioned above.

Figure 1:
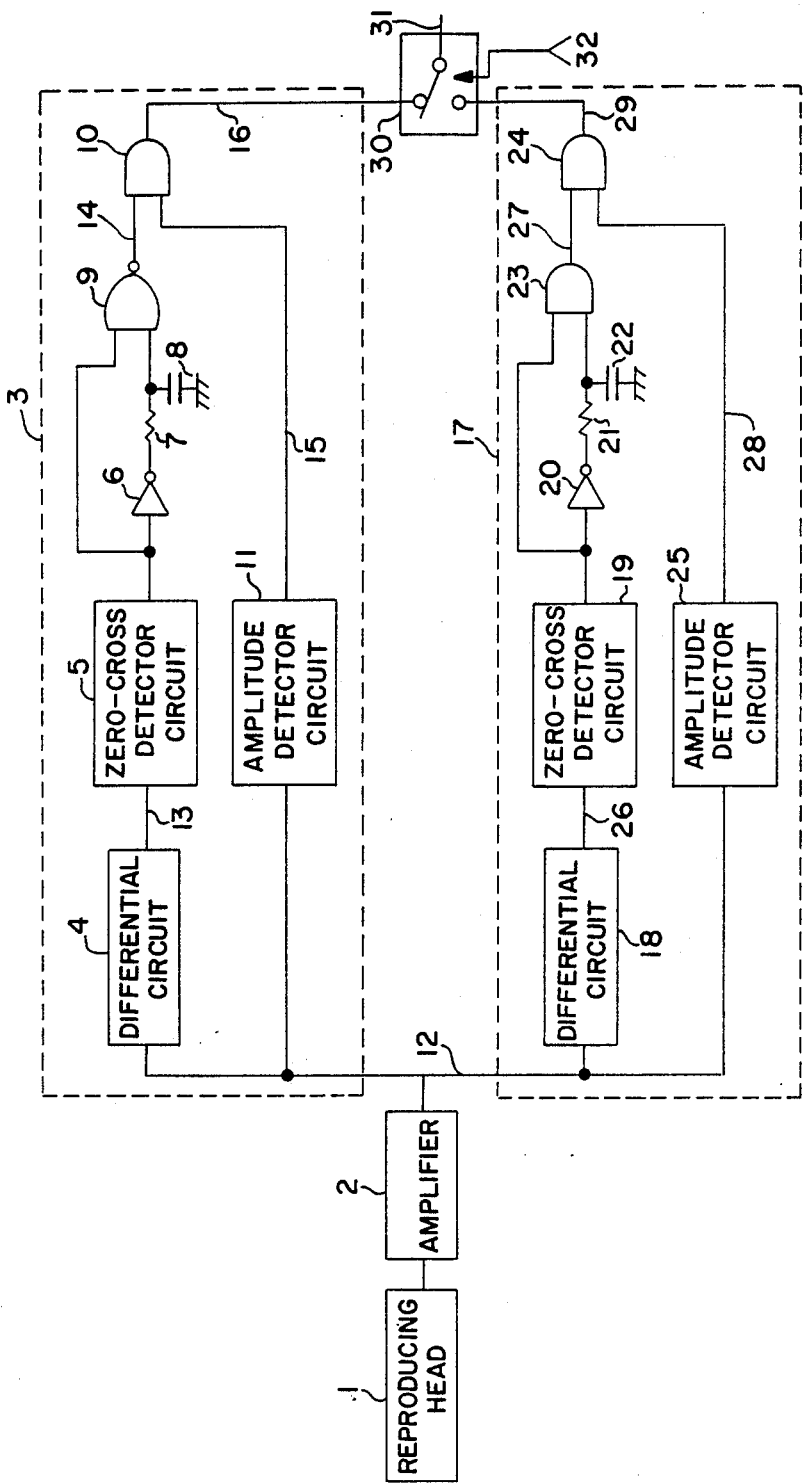
FIG. 1 is a circuit diagram showing the construction of the data reproducer of an optical magnetic memory device of an embodiment of the present invention.
Figure 2:
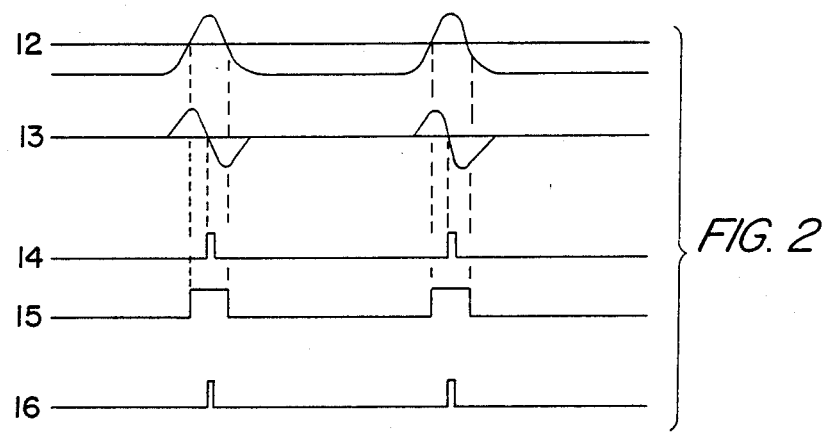
FIG. 2 is a signal waveform chart showing the signal waveform in detecting the positive peaks for the side A of the recording medium.
Figure 3:
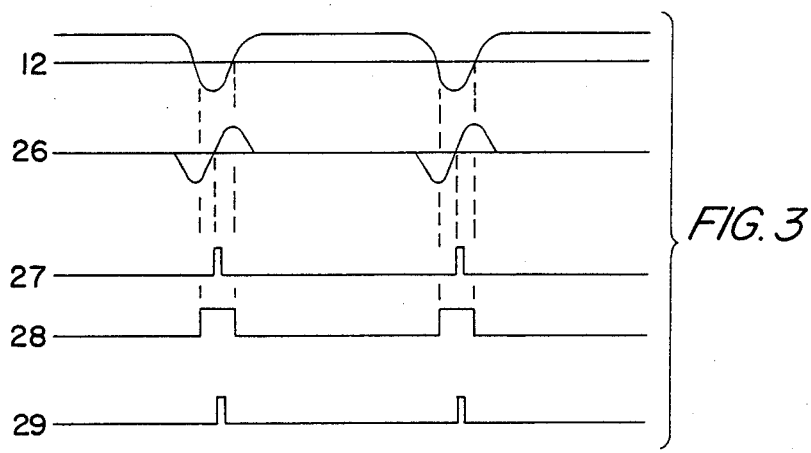
FIG. 3 is a signal waveform chart showing the signal waveform in detecting the negative peaks for the side B.

FIG. 1 shows the construction of the data reproducer in an embodiment of the optical magnetic memory device of the present invention. FIG. 2 shows signal waveforms generated by reproduction from the side A of the memory device of FIG. 1. FIG. 3 shows signal waveforms by reproduction from the side B of the memory device of FIG. 1. In FIGS. 1, 2 and 3, the same components are described by the same numbers.

Referring to FIG. 1, a signal 12 reproduced by a reproducing head 1 and amplified by an amplifier 2 is led to a positive peak detector circuit 3 (enclosed by a broken line) and to a negative peak detector circuit 17 (enclosed by a broken line).

The positive peak detector circuit 3 detects positive peaks in the following manner. A signal output 13 from a differential circuit 4 is converted to a digital signal in a zero-cross detector circuit 5 and sent into the subsequent circuit for positive peak detection. Specifically, the circuit made up of an inverter 6, a resistor 7, a capacitor 8 and a NOR gate 9 detects the falling edge of the signal output from the zero-cross detector circuit 5 or namely the positive peak of the reproduced signal 12, and outputs a signal 14. The signal 14 and a signal output 15 from an amplitude detector circuit 11 are input to an AND gate 10 which takes their logical product and outputs a positive peak, detection signal 16. The signal 16 which has detected the positive peak position alone is led to one of the two inputs of a switching circuit 30.

The negative peak detector circuit 17, detects negative peaks in the following manner. A signal output 26 from a differential circuit 18 is converted to a digital signal in a zero-cross detector circuit 19. The differential circuit 4 or 18 and the zero-cross detector circuit 5 or 19 may be shared between the positive and negative peak detector circuits 3 and 17. Negative peak position is detected by the subsequent circuit in the following manner. The circuit made up of an inverter 20, a resistor 21, a capacitor 22 and an AND gate 23 detects the rising edge the signal output from the zero cross detector circuit 19 or namely the negative peak of the reproduced signal 12, and outputs a signal 27. The signal 27 and a signal output 28 from an amplitude detector circuit 25 are input to an AND gate 24 which takes their logical product of them and outputs a negative peak detection signal 29. The signal 29 which has detected negative peak position alone is led to the other input of the switching circuit 30.

The switching circuit 30 selects either the positive peak detection signal 16 or the negative peak detection signal 29 according to a control signal 32 such as a recorded side identification signal, and outputs a signal 31 which is converted to information data by a data demodulator circuit.

FIGS. 2 and 3 are signal waveforms related to positive peak detection on the side A and negative peak detection on the side B, respectively. As clear from FIGS. 2 and 3, the reproduced signals 12 on the side A and on the side B have reversed polarities. For the side A, the signal output 13 from the differential circuit 4 crosses the zero level from the positive to the negative side at the position corresponding to the positive peak. For the side B, in contrast, the signal output 26 from the differential circuit 18 crosses the zero level from the negative to the positive side at the position corresponding to the negative peak. For peak detection, therefore, it is only necessary to detect the falling edge of the signal output from the zero-cross detector circuit 5 on the side A, and to detect the rising edge of the signal output from the zero-cross detector circuit 19 on the side B. The positive peak detection signal 16 which corresponds to the positive peak position alone is obtained based on the logical product taken from the falling edge detection signal 14 together with the amplitude detection signal 15, on the side A. The negative peak detection signal 29 which corresponds to the negative peak position alone is obtained based on the logical product taken from the rising edge detection signal 27 together with the amplitude detection signal 28, on the side B. The peak detection signal 16 for the side A or the peak detection signal 29 for the side B is selected by the switching circuit 30 shown in FIG. 1 according to the control signal 32, and transmitted to the data demodulator circuit.

When information is recorded in the recording medium in such a manner as to allow reproduction to be achieved by detecting the intervals between recorded marks as described above, data reproduction is possible from both A and B sides simply by selecting the positive or negative peak detection signal according to the control signal. In the above description, it is assumed that a signal reproduced from the side A has positive peaks and that reproduced from the side B has negative peaks. Alternatively, a signal reproduced from the side A may have negative peaks and that from the side B may have positive peaks.

An optical magnetic disc memory device has been described as an example of the optical magnetic memory device of the present invention. The invention is not limited to a disc recording medium but may be applied to an optical magnetic memory device of other type such as tape with magnetic film on both sides.

According to the above embodiment of the present invention, when data is recorded on the recording medium in such a manner as to permit detection of the interval between recorded marks for data reproduction, the optical magnetic memory device can reproduce information data from either side of the magnetic films of the recording medium which have been initialized in the same direction. In this embodiment, magnetic film may be formed on one side or on both sides of the recording medium.

The present invention may adopt a recording method which enables data reproduction to be achieved by detecting the interval between reference marks. Such recording method is described now. A method of detecting the interval between reference marks is also described.

Figure 11:
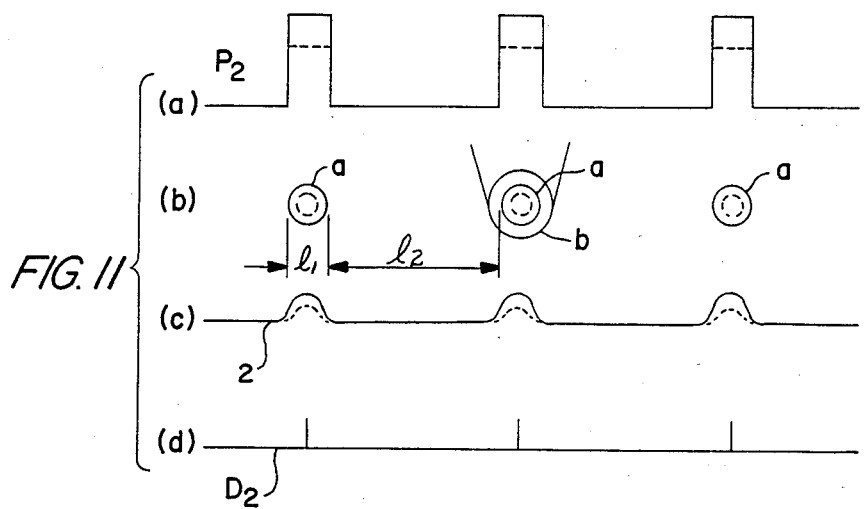
FIGS. 11 (a) through 11 (d) show recording and reproducing characteristics of another embodiment of the optical memory device of the present invention.

According to this second embodiment, an optical magnetic disc memory device as an example of the optical memory device of the present invention uses the RZ method in recording data on a data recording medium (hereinafter called disc) in such a manner as to permit detection of the interval between reference marks for data reproduction. FIGS. 11 (a) and 11 (b) show the recording characteristics of this embodiments. In this embodiment, a reference mark is a data-recorded bit. To record a reference mark, a recording laser beam $P_2$ (Refer to FIG. 11 (a)) is radiated on the disc after being modulated in intensity by the RZ method as shown by a solid line according to an information signal. Then, only the part of the magnetic film on the disc exposed to the laser beam of high intensity rises in temperature and reduces in coercive force When an external auxiliary magnetic field is simultaneously applied to the disc with this state, magnetization orientation is reversed so that a recorded bit "a" is formed as a reference mark on the disc (see FIG. 11 (b)).

According to this method, the recorded bit length "$l_1$" is shorter than the non-recorded bit length "$l_2$". In FIG. 11 (a), the broken lines indicate a laser beam of reduced intensity.

A light spot "b" (see FIG. 11 (b)) which is obtained by condensing laser beam of lower intensity than the recording laser beam $P_2$ is used for reproducing information from the recorded bit "a" formed on the disc. Reproduced signal $S_2$ thus obtained is shown in FIG. 11 (c). Data signal $D_2$ shown in FIG. 11 (d) is obtained by detecting peaks of the reproduced signal $S_2$. The data signal $D_2$ has detected the intervals between adjacent recorded bits "a" and "a" (or the intervals between recorded marks formed by the RZ method).

However, as the difference in the area between the recorded portion and non-recorded portion within the range of the light spot "b" is very small, the reproduced signal $S_2$ reproduced by the light spot "b" from the recorded bit "a" formed by the RZ method has a small amplitude. If the intensity of the recording laser beam $P_2$ reduces as shown by broken lines, the area of the recorded bit "a" becomes smaller, further reducing the amplitude of the reproduced signal $S_2$, which hampers satisfactory reproduction of information. This phenomenon is more conspicuous as the length of the recorded bit "a" is made smaller to raise the linear bit density for higher recording density. Therefore, when information is recorded and reproduced by the method in which the recorded bit length "$l_1$" is longer than the non-recorded bit length "$l_2$", reduction in the intensity of laser beam or increase in the recording density may result in less reliable information signal reproduction. Furthermore, formation of recorded bits may possibly be hampered not only by the reduction in the laser beam intensity but also by deterioration of the recording sensitivity and of the recording capacity of the data recording medium.

For the purpose of solving the above problems, another embodiment described below is characterized in that a reference mark is a non-recorded portion.

Figure 10:
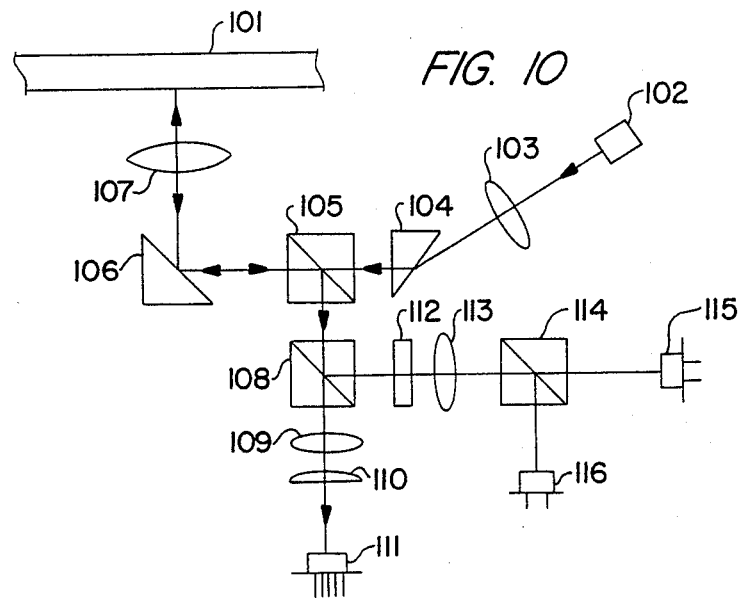
FIG. 10 schematically shows the construction of an optical magnetic disc memory device, an embodiment of an optical memory device of the present invention capable of recording, reproducing and/or erasing information.

FIG. 10 schematically shows the construction of an optical magnetic disc memory device, an example of an optical memory device capable of recording, reproducing and erasing information.

102 is a semiconductor laser which emits a laser beam of a predetermined intensity. To record information, the recording laser beam $P_1$ emitted from the semiconductor laser 102 is converted by a collimator lens 103 into a parallel beam which is then converted to an approximately circular beam by a shaping prism 104. The beam is passed through a polarization splitter 105, a total reflection prism 106 and an objective lens 107 to be condensed to about 1 $\mu$m diameter beam, and then radiated on the magnetic film surface of a disc 101. The disc 101 is a magnetic recording medium whose easy magnetization axis is perpendicular to the magnetic film surface.

In signal reproduction, a laser beam of lower intensity than that for recording is emitted from the semiconductor laser 102. The laser beam travels over the same route as in recording, and irradiates the magnetic film surface of the disc 101. Information-bearing light reflected from the magnetic film has an inclined plane of polarization due to the magneto-optic effect (Kerr effect) of the magnetic film. After passing through the objective lens 107, the total reflection prism 106 and the polarization beam splitter 105, the reflected information light is separated from the incident laser beam and split into two light beams by a polarization beam splitter 108. One of the two beams is led through a cylindrical lens 110 into an optical detector 111. A tracking reference signal and a focusing reference signal are obtained from the signal output from the optical detector 111. The other reflected information light beam is led to a halfwave plate 112 where the direction of polarization is rotated by a specified angle. Then the reflected light beam is split by a polarization beam splitter 114 into S-polarized light and P-polarized light components. Simultaneously, these information light components are detected by optical detectors 115 and 116, respectively, and converted to electric signals. Thus, to obtain reproduced signals of better S/N ratio, the optical magnetic disc memory device of this embodiment detects information light beams by the differential detection system which divides the information light into P-polarized light and S-polarized light components and obtains the difference between the detection signals of the P and S polarized light components.

Figure 9:
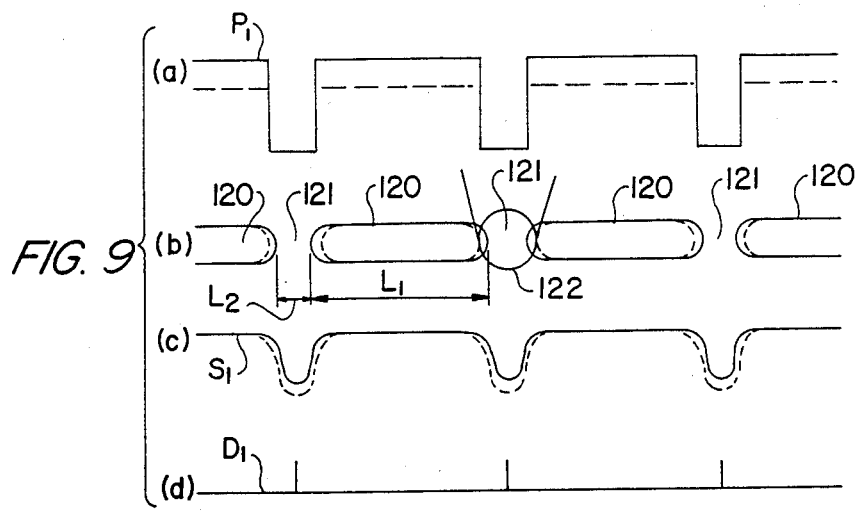
FIGS. 9 (a) through 9 (d) show recording and reproducing characteristics of an embodiment of an optical memory device of the present invention.

In the above embodiment, to permit non-recorded zones to be used as a reference mark, the recording laser beam P emitted from the semiconductor laser 102 is modulated in intensity by the RZ method so that the recorded bit length $L_1$ is longer than the non-recorded bit length $L_2$ as shown by solid line in FIG. 9 (a). Then, only the part of the magnetic film on the disc 101 exposed to the laser beam of high intensity rises in temperature and reduces in coercive force. Application of an external auxiliary magnetic field on the disc with this state causes the magnetization orientation to be reversed, so that a recorded bit 120 corresponding to the recording laser beam $P_1$ is formed on the disc 101 (see FIG. 9 (b)). The broken line of FIG. 9 (a) indicates a recording laser beam $P_1$ of reduced intensity. According to this embodiment, even if the intensity of the laser beam $P_1$ drops, reduction in the length of the recorded bit 120 is negligible as indicated by broken line in FIG. 9 (b). Recorded bits 120 of satisfactory length can be formed in any case.

For signal reproduction, laser beam spot 122 is radiated on a non-recorded bit 121 as a reference mark. Since the difference in the area between the recorded zone and the nonrecorded zone within the beam spot 122 larger in this embodiment than in the previous embodiment, the reproduced signal $S_1$ obtained has a larger amplitude as shown in FIG. 9 (c). Besides, if the intensity of the recording laser beam $P_1$ drops as shown by the broken line, the amplitude of the reproduced signal $S_1$ is still sufficiently large as indicated by broken line in FIG. 9 (c). Accordingly, reliability of the data signal $D_1$ (see FIG. 9 (d)) will increase if it is obtained by detecting the interval between the non-recorded bits 121.

As mentioned above, recorded bits 120 of sufficient length are formed on the disc 101 and a satisfactory reproduced signal $S_1$ is obtained by the RZ method if the recorded bit length $L_1$ is made longer than the non-recorded bit length $L_2$. As a result, a highly reliable data signal $D_1$ can be reproduced even with a laser beam of reduced intensity or with a high density recording medium. In the above embodiment, the influence of laser beam intensity reduction on the formation of recorded bits 120 is prevented. According to the present invention, it is possible to obtain reliable data signals even when the recording sensitivity or capacity of the data recording medium is deteriorated. In addition to the optical magnetic disc memory device, the recording and reproducing method as described above may be applied to another optical memory device which records, reproduces or erases information by using a laser beam.

According to the present invention, as understood from the above, since information is recorded by the RZ method so that recorded bit length is longer than non-recorded bit length, the recording characteristic is sufficiently good to reproduce a signal of high quality. Therefore, the present invention makes it possible to realize an optical memory device which reproduces highly reliable data.

While only certain embodiments of the present invention have been described, it will be apparent to those skilled in the art that various changes and modifications may be made therein without departing from the spirit and scope of the present invention as claimed.

What is claimed is:

1. An optical magnetic memory device, comprising:
   an optical magnetic recording medium having a magnetic film on at least one surface thereof, said magnetic film having a magnetization axis biased in a predetermined direction;
   irradiating means for recording information on said magnetic film by reversing the magnetization axis direction of selected portions of said film to be opposite to said predetermined direction, said information being recorded by a return-to-zero (RZ) method in which recorded portions of said film are formed by said reverse magnetization axis portions and non-recorded portions of said film have a length substantially shorter than said recorded portions; and
   means for reproducing information from said magnetic film including means for detecting the non-recorded portions of said film by the length thereof;
   said means for reproducing interpreting said non-recorded portions as data "1" bits and interpreting intervals longer than a predetermined length between said non-recorded portions as data "0" bits.

2. An optical magnetic memory device as claimed in claim 1, wherein said means for reproducing includes means for producing a signal having peaks corresponding to said non-recorded portions of said magnetic film.

3. An optical magnetic memory device as claimed in claim 1, wherein said optical magnetic recording medium further includes a magnetic film on a surface opposite to said one surface, said magnetic film on said opposite surface having a magnetization axis biased in said predetermined direction, said means for reproducing including means for producing a first signal having a peaks of a first polarity corresponding to the non-recorded portions on said one surface, and a second signal having peaks of a second polarity opposite to said first polarity corresponding to the non-recorded portions on said opposite surface.

4. An optical magnetic memory system, comprising:
   an optical magnetic recording medium having a magnetic film on first and second opposing surfaces thereof, said magnetic films having a magnetization axis biased in a predetermined direction;
   irradiating means for recording information on said first and second surfaces by reversing the magnetization axis direction of selected portions of said magnetic films to be opposite to said predetermined direction, said information being recorded by a return-to-zero (RZ) method in which recorded portions of said films are formed by said reversing the direction axis of magnetization of those selected portions, said recorded portions having a length substantially longer than non-recorded portions; and
   reproducing means for reproducing information from said magnetic films including,
      detecting means for detecting non-recorded portions between said recorded portions of said films,
      signal generation means, responsive to said detecting means, for producing a first signal having peaks of a first polarity corresponding to the recorded portions on said first surface and a second signal having peaks of a second polarity opposite to said first polarity corresponding to the recorded portions on said second surface, and
      selecting means for selecting one of said first and second signals in response to a control signal to reproduce information recorded on said first or second surfaces, respectively.

5. A method for recording and reproducing information from magnetic film having first and second opposing surfaces thereof, comprising the steps of:
   biasing a magnetization axis of the magnetic film of the first and second opposing surfaces in a predetermined direction;
   reversing said magnetic axis of selected portions of the magnetic film;
   recording information on said selected portions by a return-to-zero (RZ) method, said selected portions having lengths substantially longer than corresponding non-selected portions;
   detecting intervals between said selected portions having information recorded therein;
   producing a first signal of a first polarity corresponding to said selected portions of the first surface;
   producing a second signal of a second polarity opposite to said first polarity corresponding to said selected portions on the second surface;
   selecting one of said first and second signals in response to a control signal; and
   reproducing information corresponding to said one signal developed by said step of selecting.

* * * * *

UNITED STATES PATENT AND TRADEMARK OFFICE
CERTIFICATE OF CORRECTION

PATENT NO. : 4,939,710

DATED : July 3, 1990

INVENTOR(S) : Hiroshi FUJI et al

It is certified that error appears in the above-identified patent and that said Letters Patent is hereby corrected as shown below:

Attached are Figures 5 and 6 which are missing from the patent.

Signed and Sealed this

Fourth Day of August, 1992

*Attest:*

DOUGLAS B. COMER

*Attesting Officer*     *Acting Commissioner of Patents and Trademarks*

UNITED STATES PATENT AND TRADEMARK OFFICE
CERTIFICATE OF CORRECTION

PATENT NO. : 4,939,710

DATED : July 3, 1990

INVENTOR(S) : Hiroshi FUJI, Shigemi MAEDA, Takeshi YAMAGUCHI, Toshihisa DEGUCHI and Shozou KOBAYASHI It is certified that error appears in the above-identified patent and that said Letters Patent is hereby corrected as shown below: Figures 5 and 6 are missing from the Patent. Please include Fig. 5 (see below) and Fig. 6 (see next page) in the Patent, Number 4,939,710.

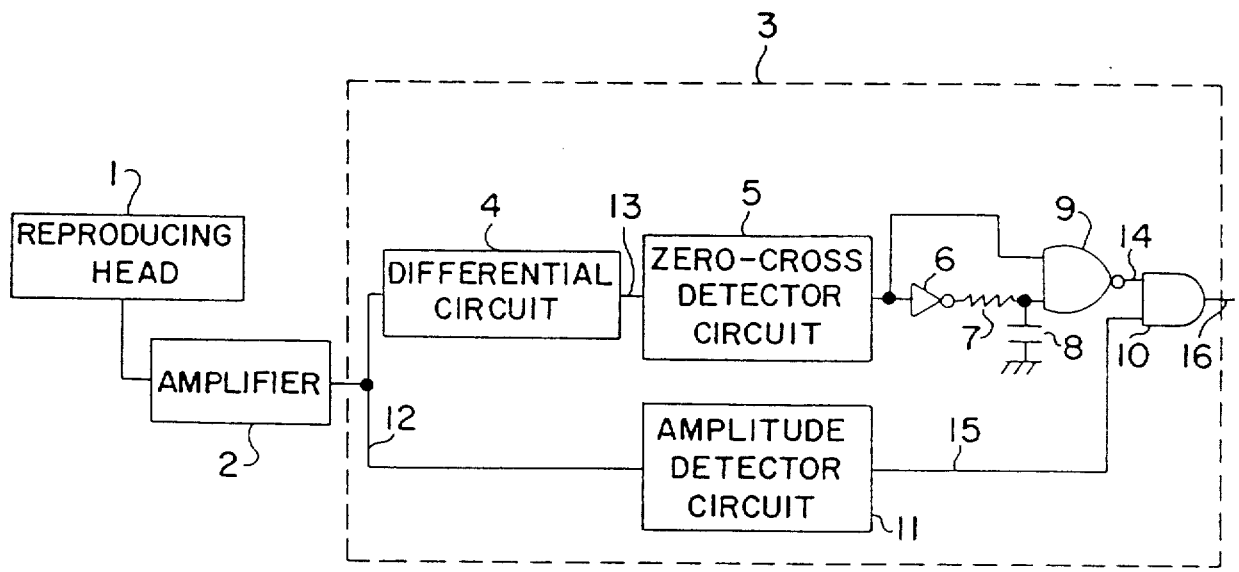

FIG. 5

UNITED STATES PATENT AND TRADEMARK OFFICE
CERTIFICATE OF CORRECTION

PATENT NO. : 4,939,710  Page 3 of 3
DATED : July 3, 1990
INVENTOR(S) : Hiroshi FUJI, Shigemi MAEDA, Takeshi YAMAGUCHI, Toshihisa DEGUCHI and Shozou KOBAYASHI It is certified that error appears in the above-identified patent and that said Letters Patent is hereby corrected as shown below: Please include Fig. 6 below in the Patent, No. 4,939,710.

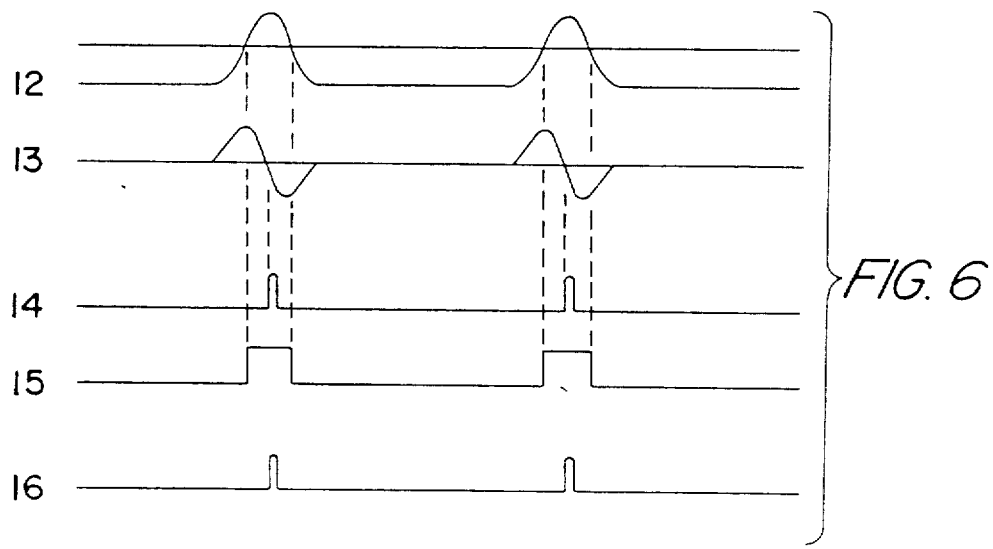

FIG. 6